(12) United States Patent
Nagel et al.

(10) Patent No.: US 6,629,594 B2
(45) Date of Patent: Oct. 7, 2003

(54) DEVICE AND METHOD FOR HANDLING OBJECTS, IN PARTICULAR ITEMS OF LUGGAGE

(75) Inventors: Günther Nagel, Graben-Neudorf (DE); Georg Gutermuth, Heidelberg (DE); Martin Koini, Sörth (DE); Rainer Strube, Stuttgart (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/910,742

(22) Filed: Jul. 23, 2001

(65) Prior Publication Data

US 2002/0020607 A1 Feb. 21, 2002

(30) Foreign Application Priority Data

Jul. 22, 2000 (DE) .......................... 100 35 810

(51) Int. Cl.[7] .............................. B65G 15/58
(52) U.S. Cl. ........................ 198/468.6; 901/7
(58) Field of Search ............. 198/468.6, 482.1, 198/460.3; 901/7; 414/725, 416.04

(56) References Cited

U.S. PATENT DOCUMENTS

| | | | | |
|---|---|---|---|---|
| 4,434,888 A | * | 3/1984 | Divoux et al. | 198/468.6 X |
| 4,740,135 A | * | 4/1988 | Shulenberger | 198/468.6 X |
| 5,435,432 A | * | 7/1995 | Tacchi et al. | 198/468.6 X |
| 6,361,265 B1 | * | 3/2002 | Mahoney | 198/468.6 X |

* cited by examiner

Primary Examiner—James R. Bidwell
(74) Attorney, Agent, or Firm—Laurence A. Greenberg; Werner H. Stemer; Ralph E. Locher

(57) ABSTRACT

The invention relates to a device and to a method for handling objects, in particular items of luggage. The device has a supporting arm that is freely moveable in at least two axes and that is articulated on a central unit which is positioned at the end of a conveyor belt for conveying objects. The movement of the supporting arm is controlled in a predeterminable manner and a loading device is configured at the free end of the supporting arm. The loading device has a supporting platform for picking up objects and has a rear and a side boundary against which the object that has been picked up in each case rests. The device includes an unloading device which removes the object that has been picked up from the supporting platform.

29 Claims, 3 Drawing Sheets

DEVICE AND METHOD FOR HANDLING OBJECTS, IN PARTICULAR ITEMS OF LUGGAGE

BACKGROUND OF THE INVENTION

Field of the Invention

The invention relates to a device for handling objects, in particular items of luggage. This device is connected in particular to a supporting arm which is freely moveable in at least two axes and is articulated on a central unit which is positioned at the end of a conveying track for objects, in particular a conveyor belt. The movement of the supporting arm is controlled in a predeterminable manner.

Devices of this type are conventionally referred to as loading robots. Such known devices have a free, moving end that is frequently provided with hooks or grippers that are used to move the object concerned.

Known devices of this type that have been provided or that can be provided have not been able to reliably grasp or maintain a hold on particular types of individual objects. Such types of individual objects that present problems are, for example items of luggage, which differ greatly in their external form with regard to shape, dimensions and weight. Problems have occurred again and again in that, for example, the object concerned is not reliably grasped and that during the transporting movement, the object falls onto the ground. Alternatively, hooks or grippers that have been provided for grasping the object in order to prevent the object from falling can press into the casing of the object and can thereby externally damage the object. By this means, both the shape of the object and its integrity can be destroyed, which means that its serviceability is at least restricted.

In order to pick up objects, in particular items of luggage or freight, it has been proposed in DE(E7490) to configure a picking-up device on a robot arm in which the device is designed like a drawer which is open to the loading side and has a loading surface with a back wall and two side walls. The loading surface is designed as a conveyor belt. The goods being transported are picked up or deposited by a change in the running direction of the conveyor belt.

Even though this proposed device operates very efficiently and in a manner protective of material, equipping it with a motor-driven picking-up device is very complicated.

SUMMARY OF THE INVENTION

It is accordingly an object of the invention to provide a device for handling objects of the type mentioned at the beginning and a method for picking up and loading objects which overcomes the above-mentioned disadvantageous of the prior art apparatus and methods of this general type. In particular, it is an object of the invention to provide a device of the type mentioned at the beginning which is of simple design and nevertheless permits uncomplicated picking-up and depositing of objects of different geometry, shape and mass, where attention is paid to handling the objects in a manner protective of the materials and the shapes of the objects.

With the foregoing and other objects in view there is provided, in accordance with the invention a device for handling objects conveyed to an end of a conveying track. The device includes a central unit that is positioned at the end of a conveying track that conveys an object. A supporting arm is articulated on the central unit for moving in a controlled movement about at least two axes in a predetermined manner. The supporting arm has a free end. A loading device is configured at the free end of the supporting arm. The loading device has a supporting platform for picking up the object. The loading device has a side boundary against which the picked-up object can rest and has a rear boundary against which the picked-up object can rest. An unloading device is also provided for removing the picked-up object from the supporting platform.

In a departure from the prior art device that was proposed, the platform which serves as the loading surface is just a flat or level surface which is bounded by a rear and a side bearing strip. In addition, an unloading device is provided which removes the respective load in a damage-free manner using very simple means.

In accordance with an added feature of the invention, the platform which is assigned to the loading device is flat and is slanted by, for example, 15° towards the supporting arm, so that the object which has been picked up rests against the rear boundary as a function of gravity. The slanting, which in a development of the invention can be integrated from the outset into the platform, has the effect that the load passes completely onto the platform virtually automatically.

In accordance with an additional feature of the invention, the side boundary which is provided is configured either on the left or on the right side of the platform. This makes it possible for the device according to the invention to be able to be adapted without any problem to the particular local conditions. In this case, it has proven particularly favorable if the side boundary is formed by a collapsable strip which is provided on both sides. In this case, however, only one strip is positioned upwards, while the other boundary is preferably folded or collapsed horizontally.

In accordance with another feature of the invention, the boundary which is folded or collapsed downwards can be configured recessed in the platform or can be designed in such a manner that the boundary which is folded or collapsed downwards bears against the lower side of the platform.

The particular advantage of this asymmetrical configuration of the side bearing configurations is based on the fact that the handling apparatus provides virtually no restriction in terms of area for the load which is to be picked up. Such a restriction would limit the usability of the apparatus, since the available loading surface of the platform is used only as a load-picking-up surface where the load can extend over the sides that do not have a bearing configuration.

In accordance with a further feature of the invention, the side boundary can be lower than the object which is to be picked up. In this case, the bearing strip actually acts only as a stop for the load when the load is being picked up and permits objects of different height to be picked up and to be introduced into the designated storage locations having an upwards boundary, for example in a shelf or in a container. In this manner, the side bearing strip is not an impediment.

In accordance with a further added feature of the invention, the unloading device is configured on the platform. The unloading device is in particular characterized in that it pushes down the object which has been picked up, for example an item of luggage, from the platform. It is clear from this that the unloading device is used only to clear the loading platform and is not provided for picking up a load.

In accordance with a further additional feature of the invention, the unloading device is formed by a slide which is configured on the supporting platform preferably such that it can move parallel to the back wall and is acted upon either by a hydraulic, a pneumatic or an electric drive or an electrohydraulic drive. With the aid of the slide the load which is on the supporting platform can be removed from the latter by the slide acting upon the load continuously in the direction of that longitudinal edge of the supporting platform which lies opposite the back wall.

In accordance with yet an added feature of the invention, the slide has a length which corresponds to the supporting platform, so that the supporting platform is covered over its entire surface by the slide.

In accordance with yet an additional feature of the invention, the unloading device may, however, also be designed such that it can pivot. In this case, the slide is designed such that it can pivot with respect to the supporting platform about a vertical axis, in which case the slide itself also has at least one pivoting hinge which is configured approximately half way between the pivoting point of the slide and the free end thereof and whose pivoting axis likewise runs perpendicularly with respect to the supporting platform.

Using this design, it is possible to remove the load which is situated on the supporting platform not only along the longitudinal edge of the supporting platform, but also along the lateral edge by moving the slide to one side edge of the supporting platform and in the process laterally pushing the load in front of it.

In accordance with yet another feature of the invention, the movement of the unloading device is coordinated with the movement of the supporting arm. In this case, it is provided that in proportion to the unloading device removing the object which has been picked up from the platform, the supporting arm together with the platform recedes, so that the object which has been picked up remains stationary relative to the depositing point when unloading is initiated. In other words, with the supporting arm and the device which is fastened to it, the load is brought to the depositing location and is deposited there in the final position such that the unloading device, which is coordinated with the supporting arm, prevents the load from moving, because of friction, when the loading platform is pulled back. Rather, the load virtually remains in the final position by being acted upon by the unloading device while the platform is moved back by the supporting arm.

In accordance with yet another added feature of the invention, the unloading device operates in a contact-free manner. This is preferably achieved in that the unloading device operates with compressed air and the object which has been picked up is removed from the platform by means of compressed air.

With the foregoing and other objects in view there is also provided, in accordance with the invention a method for picking up and loading objects using the device of the type described above. In a first step, the supporting arm is positioned together with the picking-up platform on the conveyor belt, so that an object which is conveyed on the latter, in particular an item of luggage, is conveyed onto the platform as far as the rear and side boundary. In a second step the supporting arm moves the platform to the depositing point, for example a container, while in a third step the object is deposited at the depositing point by the unloading device configured on the platform.

In accordance with an added mode of the invention, the supporting arm together with the platform is pulled back in the same proportion as the object which has been picked up is removed from the platform by the unloading device, so that the object which has been picked up thereby remains in place and is not moved relative to the depositing point, for example a container.

Other features which are considered as characteristic for the invention are set forth in the appended claims.

Although the invention is illustrated and described herein as embodied in a device and method for handling objects, in particular items of luggage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows an oblique top view of the device;

DESCRIPTION OF THE PREFERRED EMBODIMENTS

Figure 1:
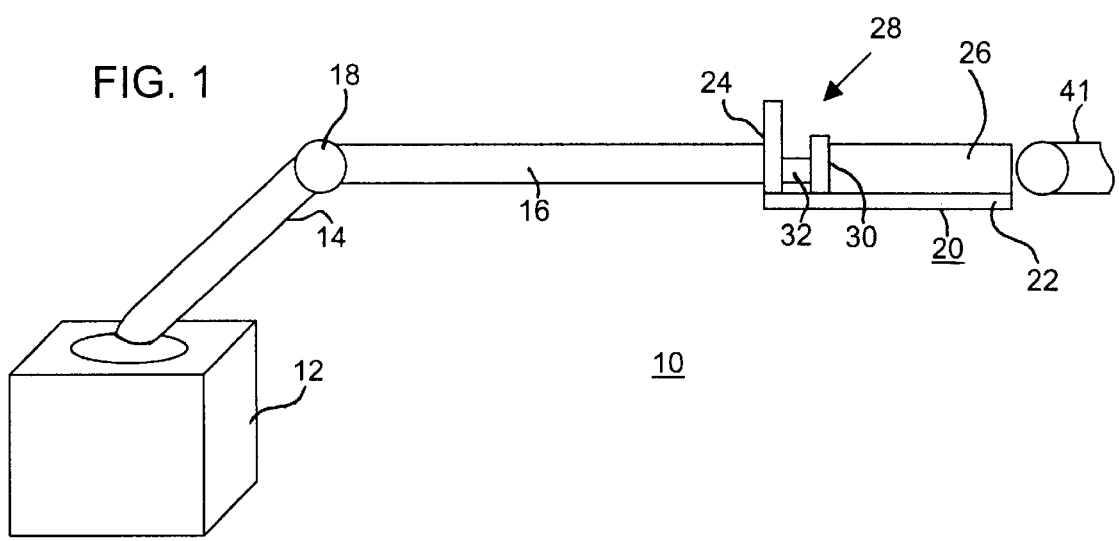
FIG. 1 shows an isometric illustration of a side view of a device configured on a stationary robot.

Referring now to the figures of the drawing in detail and first, particularly, to FIG. 1 thereof, there is shown an isometric illustration of a side view of a configuration having a stationary robot 10. The stationary robot 10 has a housing 12 which is standing on the ground and on which a two-part supporting arm having a strut-type arm 14 and a pivoting arm 16 is configured in a rotatable and pivotable manner. The two sub arms, the strut-arm 14 and the pivoting arm 16, are connected to each other by a rotating and pivoting joint 18 in order to execute the required movements.

Figure 2A:
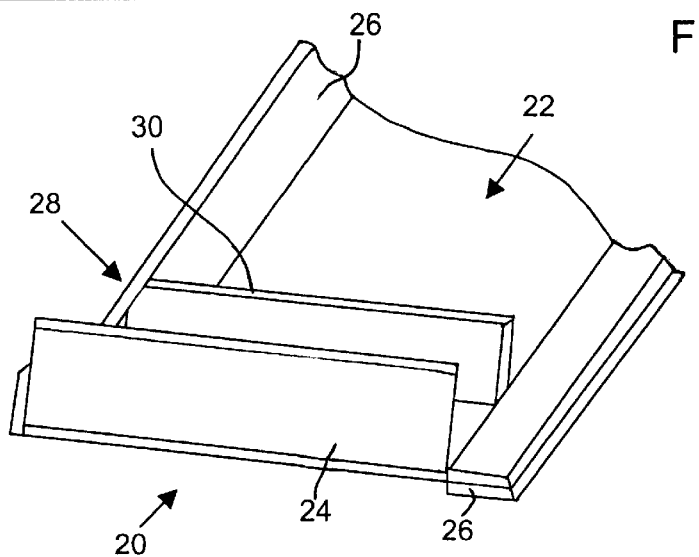
FIG. 2a shows another oblique top view of the device.
Figure 2B:
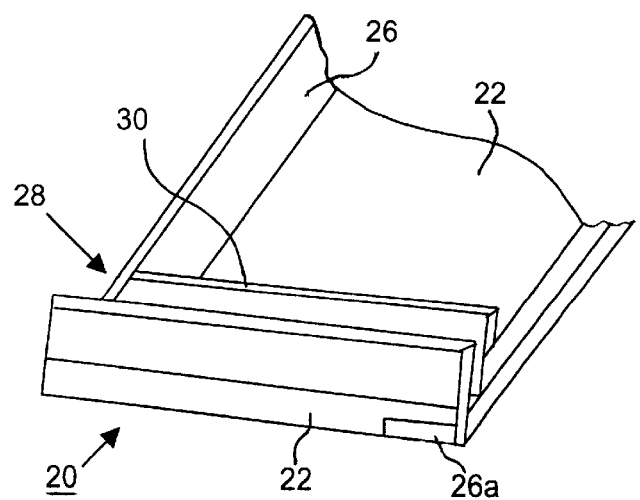
FIG. 2b shows another oblique top view of the device.
Figure 3:
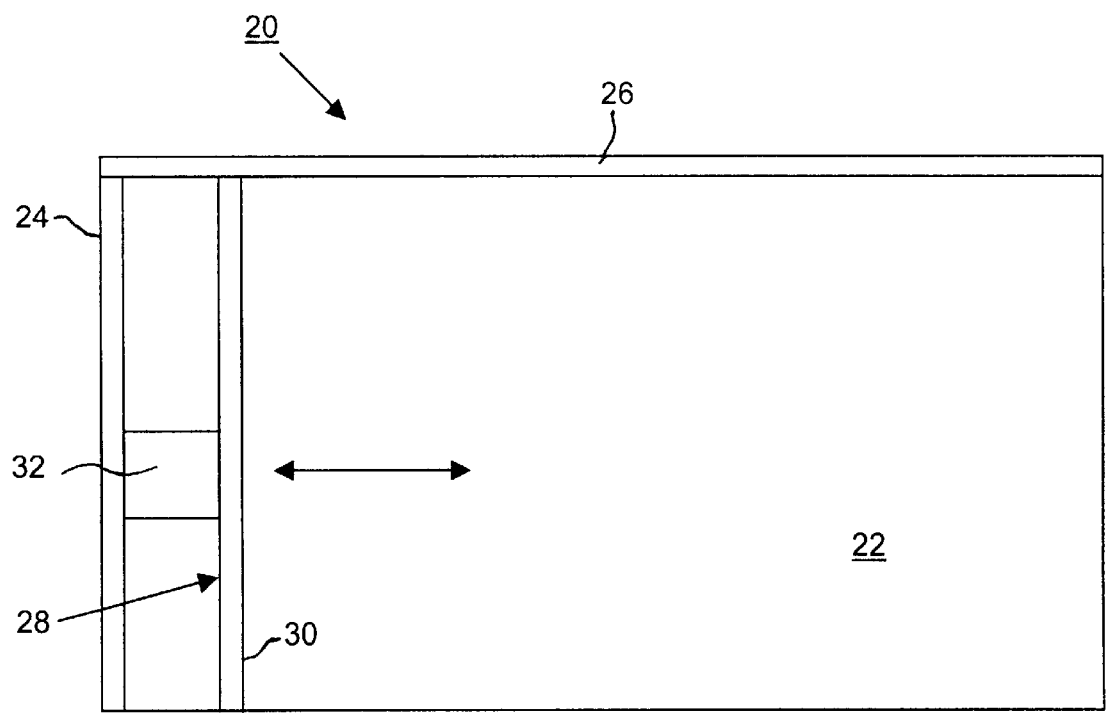
FIG. 3 shows a plan view of the device shown in FIG. 2
Figure 4:
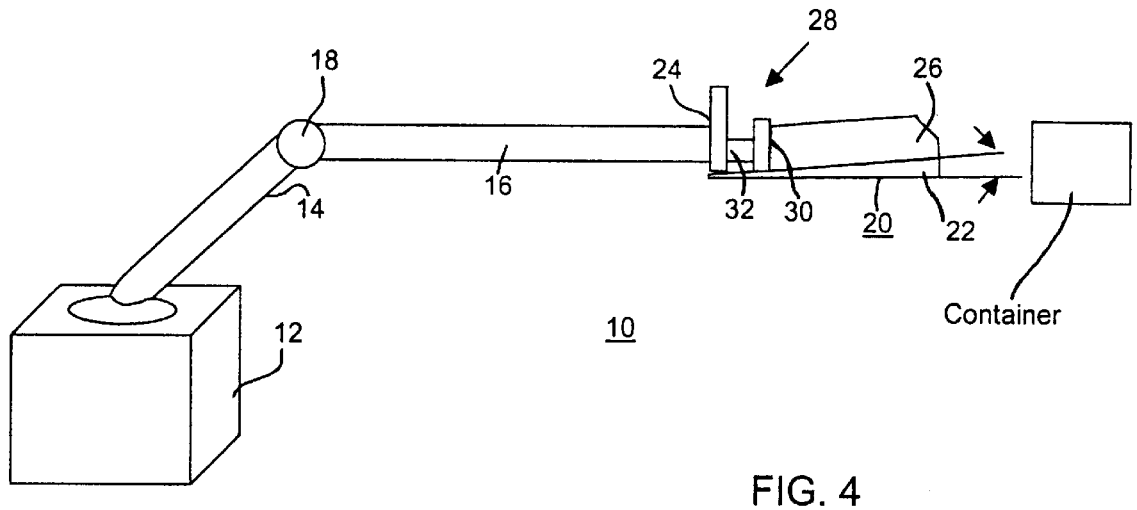
FIG. 4 shows another isometric illustration of a side view of a device configured on a stationary robot.
Figure 5:
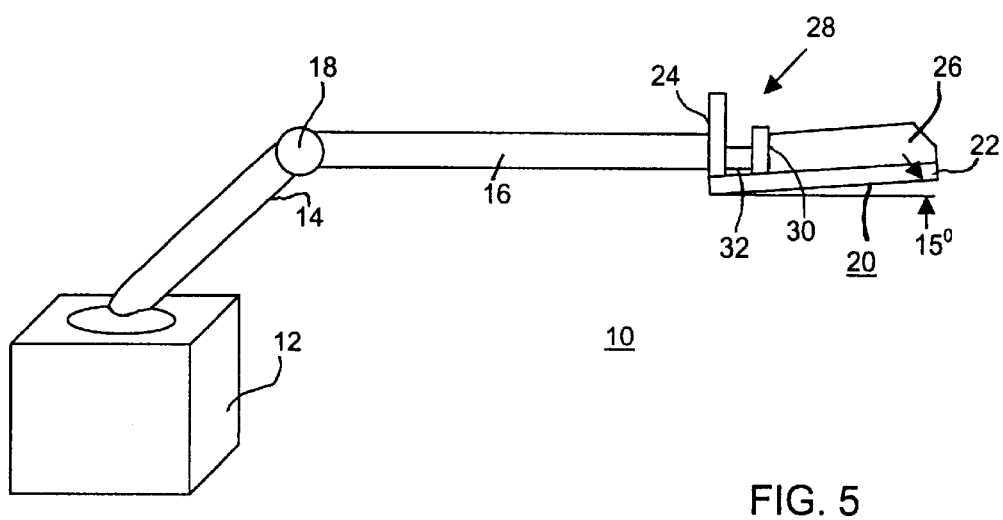
FIG 5 shows another isometric illustration of a side view of a device configured on a stationary robot.

Configured rotatably at the free end of the pivoting arm 16 is an inventive loading device 20 that is explained and shown in greater detail in FIG. 2 and in FIG. 3 with respect to its design.

The loading device 20 is formed by a supporting platform 22 and a back wall 24 which is connected thereto. The device 20 can be used for picking up freight of any type, however, in particular, can be used for picking up items of luggage. In the drawing figures, the device is illustrated without any goods being transported.

Furthermore, a side boundary 26 is provided on at least one narrow side, which runs transversely to the plane extending through the back wall 24, in order to prevent the load from sliding off laterally. The side wall 26 is of approximately the same height as the back wall 24, in which case their height is provided in such a manner that the side wall 26 and the back wall 24 sufficiently secures the goods being transported against slipping and also, when the goods being transported are picked up or deposited, do not cause any adverse effect on the accessibility to the loading or unloading location.

The supporting platform 22 and the back wall 24 are at a fixedly set angle, for example of 90°, to each other and therefore form a shovel-like configuration by means of which the particular load can be picked up and conveyed. In this case, the back wall 24, whose height is comparatively low and which can therefore also be provided as a raised edge mounted on the supporting platform 22, and the at least one side boundary for the goods being transported which are deposited on the supporting platform 22 serve as a stop.

The goods being transported can themselves be of different shape and structure, i.e. both stable shapes, for example cases or cartons, and unstable shapes, such as sacks or other forms of packaging which are of flexible shape, are possible. In each case, the load which is picked up onto the supporting platform 22 is held in position at the back wall 24.

Furthermore, the loading device 20 is equipped with an unloading device 28 which can be used to undertake the unloading procedure in a manner which is protective for the particular load. The unloading device 28 is formed by a slide 30 which is configured on the supporting platform 22 preferably in a manner such that it can move parallel to the back wall 24 and is acted upon either by a hydraulic, a pneumatic, an electric or an electrohydraulic drive 32 (only illustrated schematically rather than in greater detail here). With the aid of the slide 30, the load which is on the supporting platform 22, can be removed from the latter by the slide 30 acting on the load continuously in the direction of the longitudinal edge of the supporting platform 22 which lies opposite the back wall.

The slide 30 advantageously has a length that corresponds to the length or width of the supporting platform 22 in the same direction, so that the supporting platform is covered over its entire surface by the slide 30.

The above-described slide 30 can advantageously be formed by the back wall itself or, as illustrated in the shown exemplary embodiment, by an additional, moveable unloading wall 30 which is configured parallel to the back wall 24 and removes the goods being transported that have been deposited on the supporting platform 22. The slide 30 of the unloading device 28 acts in the manner of a scraper to move the goods being transported along the supporting platform 22 until they have left the supporting platform 22. The slide 30 of the unloading device 28 then resumes its initial position.

The moveability of the back wall 24 or of the slide 30 provides a great advantage in that depending on the loading situation, for example when loading from the side into a shelf or into an upwardly covered container, the loading device does not have a disadvantageous effect on the loading procedure by preventing access to the loading target because of its height, for example.

FIG. 3 is a schematic plan view of the configuration shown in FIG. 2 in which the operation of the slide 30 can be seen more clearly by means of a double arrow indicating its sequence of movement. Corresponding components have the same reference numerals in all of the figures.

According to a design variant of the invention (not shown here in greater detail), the unloading device 28 may, however, also be designed as a pivoting lever. In this case, the slide 30 is designed such that it can pivot about a vertical axis with respect to the supporting platform 22. In this case the slide 30 itself can additionally have at least one pivoting hinge which is configured, for example, approximately halfway between the pivoting point of the slide 30 and the free end thereof and whose pivoting axis likewise runs perpendicularly with respect to the plane extending through the supporting platform 22.

With the aid of the design according to the invention it is possible to move a load which is on the loading platform 22 not only toward the front edge of the supporting platform 22, but also to move the load laterally by appropriately moving the slide 30 to a side edge of the supporting platform 22 and in the process pushing the load in front of it.

The load can be deposited on the supporting platform 22 by a conveyor belt 41. The loading device 20, however, can also be operated similarly to a shovel or a cake server. The supporting platform 22 can be slid under the load so that the load is be picked up by the loading device 20. The back wall 24 or the slide 30 and the side wall 26 which is provided on at least one side secures the load at a respective position on the supporting platform 22.

In order to remove the load from the supporting platform 22, the supporting platform 22 is first brought into position, i.e. is set to the height of the designated depositing level, and the unloading device 28 is then activated to remove the load from the supporting platform 22.

The movement of the unloading device 28 is advantageously coordinated with the movement of the supporting arm 14, 16. In this case, the unloading device 28 advantageously moves to remove the load from the supporting platform 22 in proportion with a receding movement of the supporting arm 14, 16 together with the supporting platform 22 so that the load which has been picked up remains stationary relative to the depositing point when unloading is initiated.

In other words, the supporting arm 14, 16 and the inventive loading device 20 that is fastened thereto bring the load to the depositing location and the load is deposited there in the final position. The unloading device 28, which is coordinated with the supporting arm 14, 16 with respect to its movement, prevents the load from moving, because of friction, when the supporting platform 22 is pulled back. Rather than being acted upon by the unloading device 28, the load remains virtually in the final position while the supporting platform 22 is moved back by the supporting arm 14, 16.

We claim:

1. A device for handling objects conveyed to an end of a conveying track, the device comprising:
   a central unit for positioning at an end of a conveying track that conveys an object;
   a supporting arm that is articulated on said central unit for a controlled movement about at least two axes in a predetermined manner, said supporting arm having a free end;
   a loading device configured at said free end of the supporting arm, said loading device having a supporting platform for picking up the object, said loading device having a side boundary and a rear boundary against which the picked-up object rests; and
   an unloading device for removing the picked-up object from said supporting platform.

2. The device according to claim 1, in combination with the conveying track, wherein the conveying track is a conveyor belt.

3. The device according to claim 1, wherein said supporting platform has a flat surface that is slanted towards said supporting arm so that the picked-up object rests against said rear boundary in response to a force of gravity.

4. The device according to claim 3, wherein said supporting platform has a right side and a left side and said side boundary is located on a side selected from the group consisting of said right side and said left side.

5. The device according to claim 1, wherein said supporting platform is slanted towards said supporting arm by substantially 15°.

6. The device according to claim 1, wherein said supporting platform has a rectangular shape.

7. The device according to claim 1, wherein said supporting platform has a right side and a left side and said side boundary is located on a side selected from the group consisting of said right side and said left side.

8. The device according to claim 7, comprising:
a collapsible left-side boundary strip located on said left side and defined by said side boundary;
a collapsible right-side boundary strip located on said right side; and
a boundary selected from the group consisting of said left-side boundary strip and said right-side boundary strip being in an upward position while another boundary selected from the group consisting of said left-side boundary strip and said right-side boundary strip being in downward position.

9. The device according to claim 7, wherein said side boundary is formed by a collapsible strip.

10. The device according to claim 7, comprising:
a collapsible left-side boundary located on said left side and defined by said side boundary;
a collapsible right-side boundary located on said right side; and
a boundary selected from the group consisting of said left-side boundary and said right-side boundary being in an upward position while another boundary selected from the group consisting of said left-side boundary and said right-side boundary being in a downward position.

11. The device according to claim 10, wherein said boundary that is in the downward position is recessed in said supporting platform.

12. The device according to claim 10, wherein said boundary that is in the downward position is folded downward laterally.

13. The device according to claim 10, wherein said supporting platform has a lower side and said boundary that is in the downward position is folded downward to bear against said lower side of said supporting platform.

14. The device according to claim 1, wherein said supporting arm supports said side boundary at a lower position than that of the object to be picked-up.

15. The device according to claim 1, wherein said unloading device is configured on said supporting platform.

16. The device according to claim 15, wherein said unloading device is constructed for movement in coordination with the movement of said supporting arm.

17. The device according to claim 15, wherein said supporting arm and said supporting platform recede a distance that is proportional to an amount that the picked-up object has been removed by said unloading device such that the picked-up object is substantially stationary relative to a depositing point when removal of the picked-up object is initiated.

18. The device according to claim 15, wherein said unloading device is constructed to operate in a contact-free manner.

19. The device according to claim 15, wherein said unloading device operates pneumatically for removing the picked-up object from said supporting platform.

20. The device according to claim 15, wherein said unloading device is constructed to push the picked-up object down from said supporting platform.

21. The device according to claim 20, wherein said unloading device is constructed for movement in coordination with the movement of said supporting arm.

22. The device according to claim 20, wherein said supporting arm and said supporting platform recede a distance that is proportional to an amount that the picked-up object has been removed by said unloading device such that the picked-up object is substantially stationary relative to a depositing point when removal of the picked-up object is initiated.

23. The device according to claim 20, wherein said unloading device is constructed to operate in a contact-free manner.

24. The device according to claim 20, wherein said unloading device operates with compressed air for removing the picked-up object from said supporting platform.

25. The device according to claim 1, in combination with the object, wherein the object is a luggage item.

26. A method for picking up an object, which comprises:
using said supporting arm of the device according to claim 1 to position said supporting platform on the conveying track so that the object is conveyed from the conveying track onto said supporting platform as far as said rear boundary and said side boundary;
using said supporting arm to move said supporting platform to a depositing point; and
using said unloading device to deposit the object at the depositing point.

27. The method according to claim 26, which comprises providing a luggage item as the object.

28. The method according to claim 26, which comprises pulling back said supporting arm to move said supporting platform a distance that is proportional to an amount that the picked-up object has been removed from said supporting platform by said unloading device so that the object remains substantially in place and is not substantially moved relative to the depositing point.

29. The method according to claim 28, which comprises using a container as the depositing point.

* * * * *